US008451311B2

(12) United States Patent
Miali (10) Patent No.: US 8,451,311 B2
(45) Date of Patent: *May 28, 2013

(54) METHOD AND SYSTEM FOR VIDEO TELEPHONE COMMUNICATIONS SET UP, RELATED EQUIPMENT AND COMPUTER PROGRAM PRODUCT

(75) Inventor: Margherita Miali, Martina Franca (IT)

(73) Assignee: Telecom Italia S.p.A., Milan (IT)

( * ) Notice: Subject to any disclaimer, the term of this patent is extended or adjusted under 35 U.S.C. 154(b) by 1851 days.

This patent is subject to a terminal disclaimer.

(21) Appl. No.: 11/661,702

(22) PCT Filed: Sep. 3, 2004

(86) PCT No.: PCT/EP2004/009844
§ 371 (c)(1),
(2), (4) Date: Mar. 2, 2007

(87) PCT Pub. No.: WO2006/024319
PCT Pub. Date: Mar. 9, 2006

(65) Prior Publication Data
US 2007/0257983 A1    Nov. 8, 2007

(51) Int. Cl.
*H04N 7/14*  (2006.01)
(52) U.S. Cl.
USPC ........... 348/14.01; 348/14.11; 348/14.13
(58) Field of Classification Search
USPC ............ 348/14.01–14.16; 370/260–261; 709/204–205
See application file for complete search history.

(56) References Cited

U.S. PATENT DOCUMENTS 4,654,866 A    3/1987 Bottle et al.
5,371,534 A *  12/1994 Dagdeviren et al. ........ 348/14.01
(Continued)

FOREIGN PATENT DOCUMENTS

EP    0 999 712 A2    5/2000
FR    2 814 623        3/2002
(Continued)

OTHER PUBLICATIONS

Kumar, A. et al., "A Multi-Signaling Protocol Architecture for Voice Over IP Terminal," IEEE SM '03, vol. 2-7, pp. 1191-1199, (2004).

(Continued)

*Primary Examiner* — Melur Ramakrishnaiah
(74) *Attorney, Agent, or Firm* — Finnegan, Henderson, Farabow, Garrett & Dunner, L.L.P.

(57) ABSTRACT

In order to permit a video telephone call to be set up between at least one first video telephone terminal and at least one second video telephone terminal in a telephone network, a service center is adapted to connect with the first and second terminals over the telephone network. A telephone call is first set up between the first terminal and the second terminal in order to exchange availability signals between the terminals to seek availability to hold a video telephone call therebetween. If such availability is confirmed, the telephone call between the first and second terminals is released, and telephone calls are established between the service center and the first and second terminals, whereby the first and second terminals are connected to one another over the telephone network via the service center. A video telephone call is then set up between the first and second terminals via the service center.

19 Claims, 4 Drawing Sheets

U.S. PATENT DOCUMENTS

| | | | |
|---|---|---|---|
| 5,790,180 A | | 8/1998 | Wild |
| 5,920,693 A | * | 7/1999 | Burkman et al. ............. 709/204 |
| 6,545,697 B1 | | 4/2003 | Parker et al. |
| 6,750,897 B1 | * | 6/2004 | Moshrefi et al. ............ 348/14.08 |
| 7,283,154 B2 | * | 10/2007 | Shachar et al. ............ 348/14.08 |
| 2004/0076145 A1 | | 4/2004 | Kauhanen et al. |
| 2005/0113064 A1 | * | 5/2005 | Halsell ........................ 455/406 |
| 2007/0186002 A1 | * | 8/2007 | Campbell et al. ............. 709/231 |

FOREIGN PATENT DOCUMENTS

| | | |
|---|---|---|
| FR | 2 829 893 | 3/2003 |
| WO | WO 02/37848 A1 | 5/2002 |
| WO | WO 03/005641 A1 | 1/2003 |
| WO | WO 03/034692 A2 | 4/2003 |

OTHER PUBLICATIONS

Reid, M., "Multimedia Conferencing Over ISDN and IP Networks Using ITU-T H-Series Recommendations: Architecture, Control and Coordination," Computer Networks, vol. 31, No. 3, pp. 225-235, (1999).

Thom, G. A. et al., "H.323: The Multimedia Communications Standard for Local Area Networks," IEEE Communication Magazine, vol. 34, No. 12, pp. 52-56, (1996).

"System for Establishing Communication Between Audiovisual Terminals Using Digital Channels Up to 2 Mbit/s," International Telecommunication Union, ITU-T, Series H: Audiovisual and Multimedia Systems Infrastructure of Audiovisual Services—Communication Procedures, H.242, p. 1-94, (Mar. 2004).

* cited by examiner

Fig-1

METHOD AND SYSTEM FOR VIDEO TELEPHONE COMMUNICATIONS SET UP, RELATED EQUIPMENT AND COMPUTER PROGRAM PRODUCT

CROSS REFERENCE TO RELATED APPLICATION

This application is a national phase application based on PCT/EP2004/009844, filed Sep. 3, 2004.

FIELD OF THE INVENTION

The present invention relates to video telephone communication technology.

As used herein, "video telephone" (or, briefly, "videophone") is generally intended to encompass all those technologies enabling voice/video communications to take place on standard carriers for telephone communications.

DESCRIPTION OF THE RELATED ART

Transmitting voice and video signals on standard carriers used for transmitting speech signals (namely a standard telephone line) is made possible by compression techniques that reduce the bandwidth/bit-rate associated with those signals.

These techniques take advantage of the redundancy inherent in speech and video signals to produce a combined speech/video signal adapted to be transmitted without substantial impairment over telephone lines of standard telephone networks both of the fixed and the mobile type.

Video telephone communications have been the subject matter of extensive literature, including patent literature.

Exemplary patent documents concerning video telephone technology are U.S. Pat. No. 4,654,866, U.S. Pat. No. 5,790,180, WO 03/005641 A1 and U.S. Pat. No. 6,545,697 B1.

U.S. Pat. No. 4,654,866, for example, provides for an integrated communication system including a narrow-band telephone network and a superposed video-telephone network. To permit a video-telephone network structure independent of the structure of the narrow-band telephone network, each subscriber of the video-telephone network must be assigned a separate video-telephone call number for the path search in the broad band (video-telephone) network.

U.S. Pat. No. 5,790,180 discloses a video-telephone call handling system and method wherein a person at a video-telephone may place a call to a person who does not have a video-telephone but who does have cable television service. The system transmits the audio-portion of the conversation over standard telephone lines. The video-portion of the conversation is concurrently transmitted over cable television equipment to be viewed on the call recipient's television.

WO 03/005641 A1 relates to a communication system and method for establishing a broadband connection, for example a multi-media connection between two or more users, by means of exchanges in a communication network.

According to WO 03/005641 A, when the exchanges receive a request from a calling user to establish a broadband connection, for example a video telephone call, the exchanges first establish a minimal connection between the users and once the minimal connection is in operation, the requested broadband connection is established.

U.S. Pat. No. 6,545,697 B1 discloses a user system or device which uses a called number to establish a telephone call over a public telephone network to a called party. In response to the telephone call, the user system or device transfers a video call request to a server system over a public data network.

Despite recent, momentous advancement, a number of significant problems are still to be solved in order to provide a fully satisfactory video telephone service.

A first problem is related to the quality level of the end-to-end connection provided by a standard telephone line. By way of example, while voice communication may still be possible over a fairly noisy line, a substantial likelihood exists that the video portion of a video telephone signal attempted to be transmitted over the same line will be unintelligible. In fact, in order to be transmitted over a telephone line (especially in combination with an associated speech signal) a video signal must be subjected to a very strong reduction of redundancy, and thus becomes rather sensitive to any appreciably impairment of the quality of the telephone line.

Another factor to be taken into account lies in that future developments of videophone technologies may not being by necessity be linked to the use of a common standard for compressing the speech signal and, more to the point, the video signal. Interoperability of user apparatus possibly using different compression/de-compression standards and/or different bit-rates thus represents a basic requirement to ensure widespread use of the video telephone technologies.

Finally, a whole set of unsolved problems is related to a number of factors that make a video telephone call intrinsically different from a standard telephone call.

A calling party may not be certain of the fact that the called party be equipped to handle a video telephone call, consequently, the risk exists that a video telephone call may be attempted to be set up just to discover that the called party is not equipped to handle such a call.

Additionally, the need of running a video telephone call may arise while the two parties are already involved in a standard telephone call e.g. because one of the two parties wishes to show to the other party some specific object or item.

In this connection, the parties may wish that the costs of the video telephone call (or just the video portion of a call) should be billed according to some flexible plan: e.g. with such costs borne by the two parties with equal or different percentages: this latter option obviously includes the possibility that the costs may be borne entirely by the calling or the called party. This kind of flexible billing is not supported by standard billing procedures adopted for telephone calls, where the cost of the call is usually borne by the calling party unless specific agreements (e.g. so-called "Call Collect" or "Green Number" options) are reached before the call proper is set up.

OBJECT AND SUMMARY OF THE INVENTION

The object of the present invention is thus to provide an arrangement adapted to solve at least partly the problems highlighted in the foregoing.

According to the present invention that object is achieved by means of a method having the features set forth in the claims that follow. The invention also relates to a corresponding system, related apparatus (e.g. a video telephone terminal and/or a service center) adapted for use in such a system, and a computer program product, loadable in the memory of at least one computer and including software code portions for performing the steps of the method of the invention when the product is run on a computer. As used herein, reference to such a computer program product is intended to be equivalent to reference to a computer-readable medium containing instructions for controlling a computer system to coordinate the performance of the method of the invention. Reference to "at least one computer" is evidently intended to highlight the possibility for the present invention to be implemented in a distributed/modular fashion.

The arrangement described herein satisfactorily solves the problems mentioned in the introduction of the description.

A preferred embodiment of the invention provides for a video telephone call being between at least one first video telephone terminal and at least one second video telephone terminal in a telephone network (N) by providing a service center adapted to connect with said first and second terminals over said telephone network. A telephone call is established over said network between said first terminal and said second terminal, by exchanging between said first and second terminals during said telephone call availability signals to seek availability of said first and second terminals to hold a video telephone call therebetween. If said availability is confirmed, the following steps are performed:

i) releasing said telephone call between said first and second terminals,
ii) establishing telephone calls between said first terminal and said service center and between said second terminal and said service center, whereby said first and second terminals are connected to one another over said telephone network via said service center, and
iii) establishing a video telephone call between said first and second terminals connected via said service center.

In the arrangement described herein, the video telephone call is run under the control of a service center. When setting up the "leg" connections towards the two (or more) customers involved in the telephone call, the possibility exists of selecting for that purpose telephone lines having a quality level (e.g. noise level) adapted to ensure that the video portion of the video telephone signal is thoroughly intelligible at the reception points.

The service center is also in a position to ensure "transcoding" between different compression/de-compression standards and/or different bit-rates used by the customers involved in the call thus ensuring complete interoperability of their terminals.

Neither will the risk exist that a video telephone call may attempted to be set up just to discover that the called party is not equipped to handle such a call: in the arrangement described herein, the video telephone call is set up only as a result of consensus being reached with the parties involved as to the desire of running such a call: this entails that all the parties are properly equipped to run a telephone call.

In the arrangement described herein, the parties already involved in a standard telephone call may decide at any time to convert the telephone call into a video telephone call. Additionally, the parties may elect that the costs of the video telephone call (or just the video portion of a call) should be billed according to any sort of flexible plan, including e.g. the costs being borne by the parties with equal or different percentages. In particular, the parties may elect that the costs of the video telephone call (or just the video portion of a call) should be billed according to a billing scheme different from the billing scheme adopted for the initial telephone call.

The following detailed description of an exemplary embodiment of the invention provided in the following refers—for the sake of simplicity—to a videophone call involving two parties. However, those of skill in the art will promptly appreciate that the arrangement described herein may be applied to multi-party calls.

BRIEF DESCRIPTION OF THE ANNEXED DRAWINGS

The invention will now be described, by way of example only, by referring to the annexed figures of drawing, wherein.

DETAILED DESCRIPTION OF AN EXEMPLARY EMBODIMENT OF THE INVENTION

Figure 1:
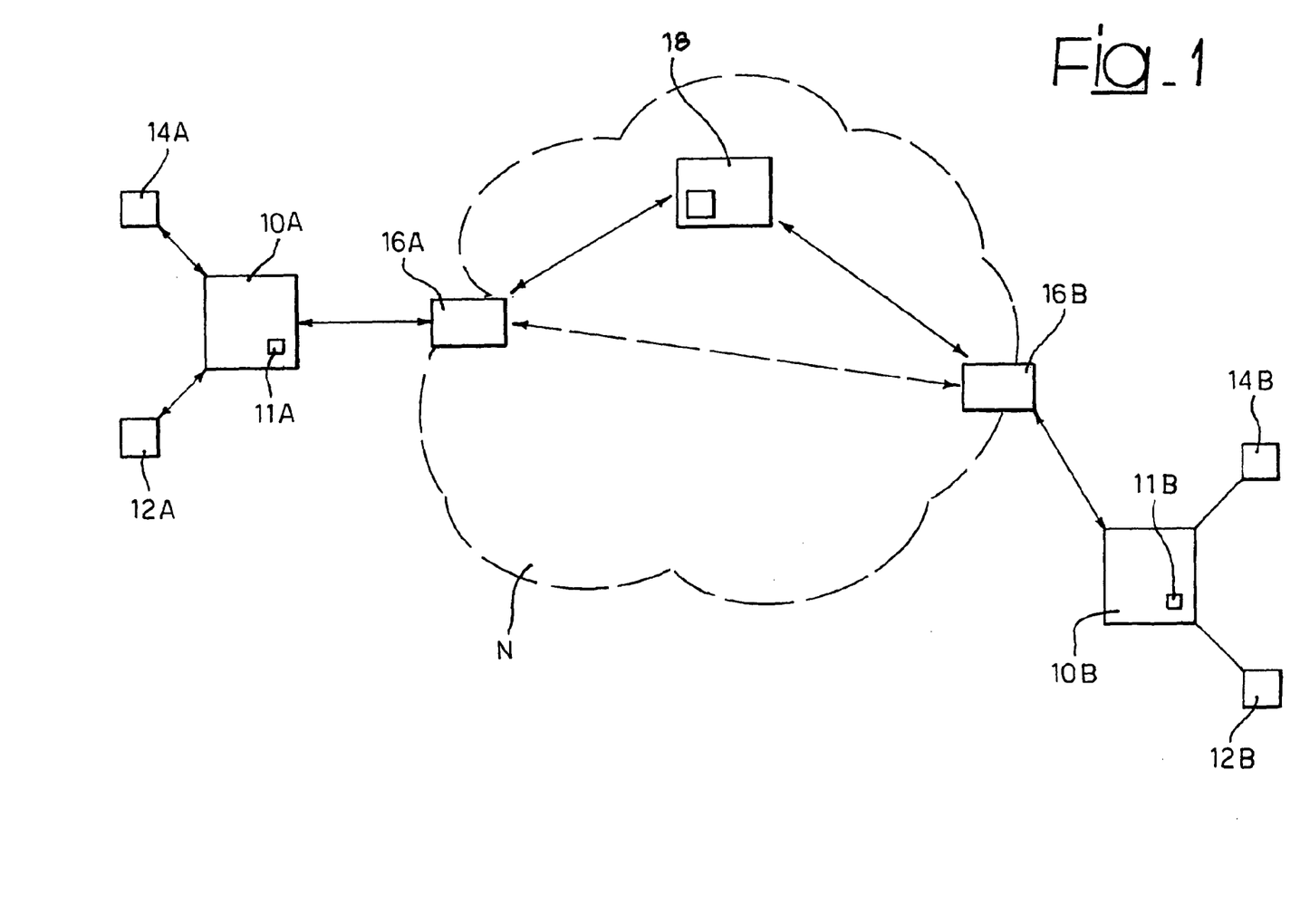
FIG. 1 is a block diagram showing a typical scenario of use of the arrangement described herein.

In the block diagram of FIG. 1, reference numerals 10A and 10B designate two terminals connected to a telephone network N.

Both terminals 10A and 10B are equipped with the videophone facilities enabling them to transmit and receive both speech and video signals via corresponding user interfaces 12A, 12B and 14A, 14B.

Specifically, each interface 12A, 12B is a speech interface typically comprised of a microphone and a loudspeaker. Each interface 14A, 14B is a video interface usually comprised of a camera (such as a camera of the type currently referred to as a "webcam") and a screen (typically comprised of an LCD screen).

Terminals of the kind described are known in the art and available commercially at the time this application is filed, thus making it unnecessary to provide a more detailed description herein.

The network N is a telephone network (fixed and/or mobile) adapted primarily to ensure speech communications between the terminals 10. For the purposes of the arrangement described herein, the network N may be of any known type.

In the purely exemplary embodiment shown herein, the terminals 10A, 10B are connected to the network N via respective nodes 16A, 16B.

The nodes 16A, 16B may be in the form of exchanges (in the case of a fixed telephone network) or in the form of base stations (BTS's) or so-called NodeB's (in the case of mobile networks). Those of skill in the art will promptly appreciate that those mentioned are purely examples of wide gamut of "nodes" currently available to connect terminals such as the videophone terminals 10A and 10B to a telephone network N.

Connection of the nodes 16A, 16B within the network N can take place via any known technology. While digital technology is largely prevailing today, the arrangement described herein is adapted to operate also with networks providing for analog transmission of signals.

In the case of digital networks, connection between the terminals 10 can take place both via a Circuit Switched (CS) line and via a Packet Switched (PS) line. The network N can be totally or partly represented by a so-called IP network, namely a network whose operation is ruled by the Internet Protocol.

Reference 18 designates a service center adapted to selectively connect to both terminals 10A, 10B based on the criteria better detailed in the followings.

Preferably, the service center 18 maintains a database adapted to collect Call Records (Call Detailed Records or, briefly, CDRs) related to video phone calls established between the two terminals 10A, 10B. Such Call Records typically include information items concerning the two (or more) parties involved in the call, the time of start of the videophone call, the duration of the call, specific criteria to be adopted for billing the videophone call to the parties involved, and so on.

In a preferred embodiment, the service center 18 is also configured (in a known manner) in order to perform transcoding between different standards (i.e. different speech/video coding formats and/or different bandwidths/bit-rates) used within the framework of a video phone call. Such a transcoding function is adapted to be activated in the case the standard adopted for videophone communication between one terminal 10A and the service center 18 is different from the standard(s) used for videophone communication between the service center 18 and the other terminal 10B. The same transcoding action can be performed also in the case where more than two terminals are involved in the process.

As indicated in the introductory portion of the description, the ability to perform such transcoding is particularly significant in respect of the video portion of the videophone signal.

Figure 2:
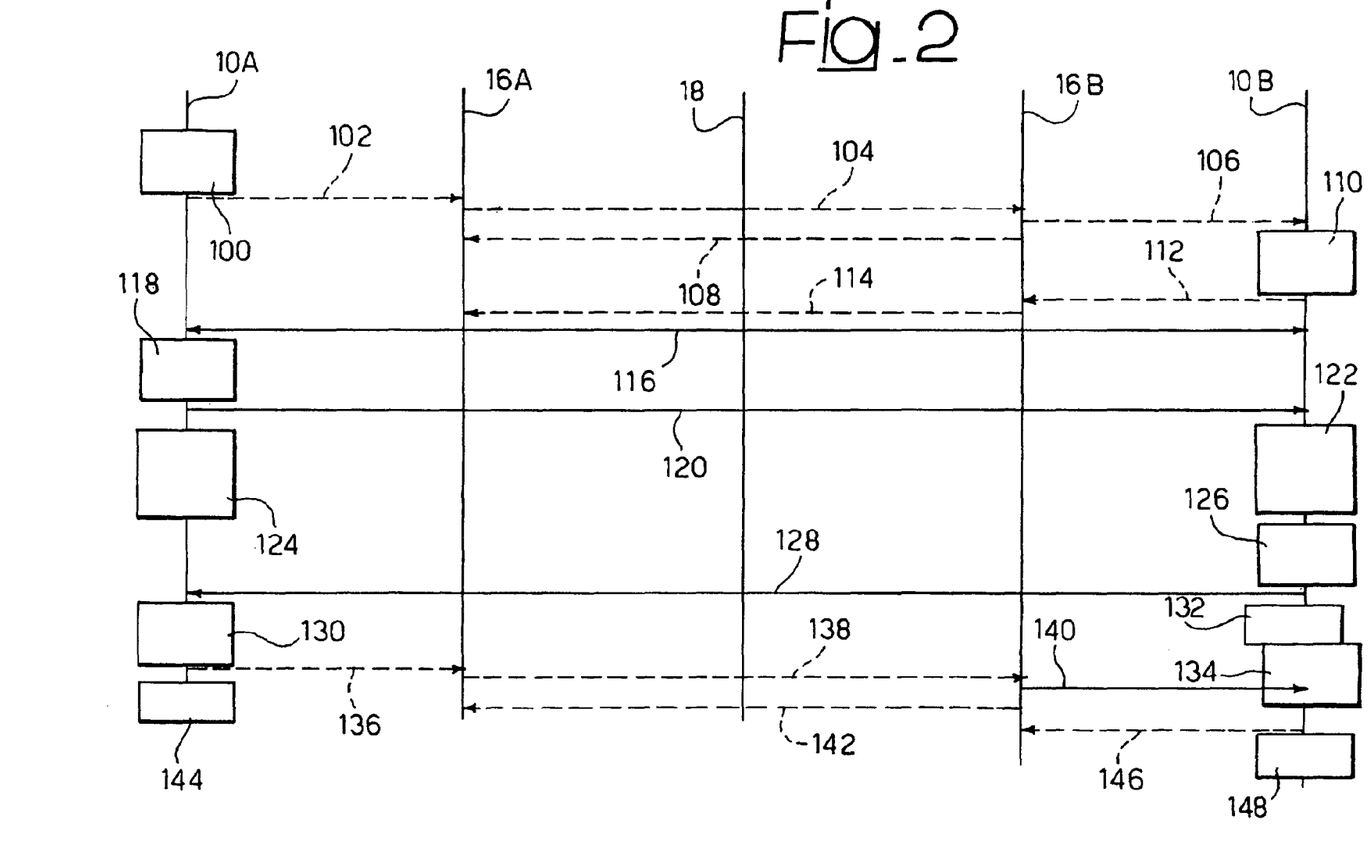
FIGS. 2 to 4 are flow-charts exemplary of a typical sequences of steps occurring in an exemplary embodiment of the arrangement described herein.
Figure 3:
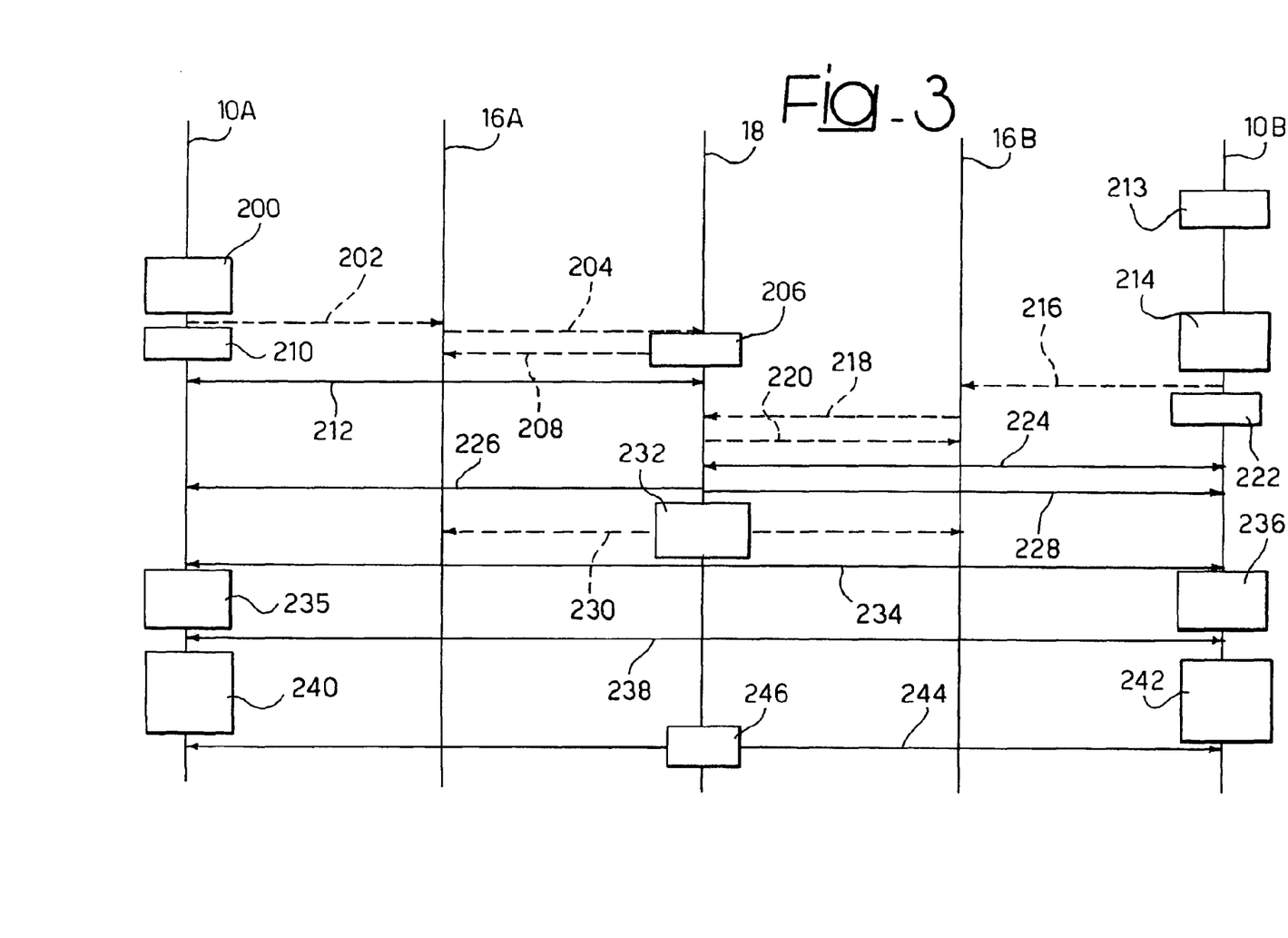
Figure 4:
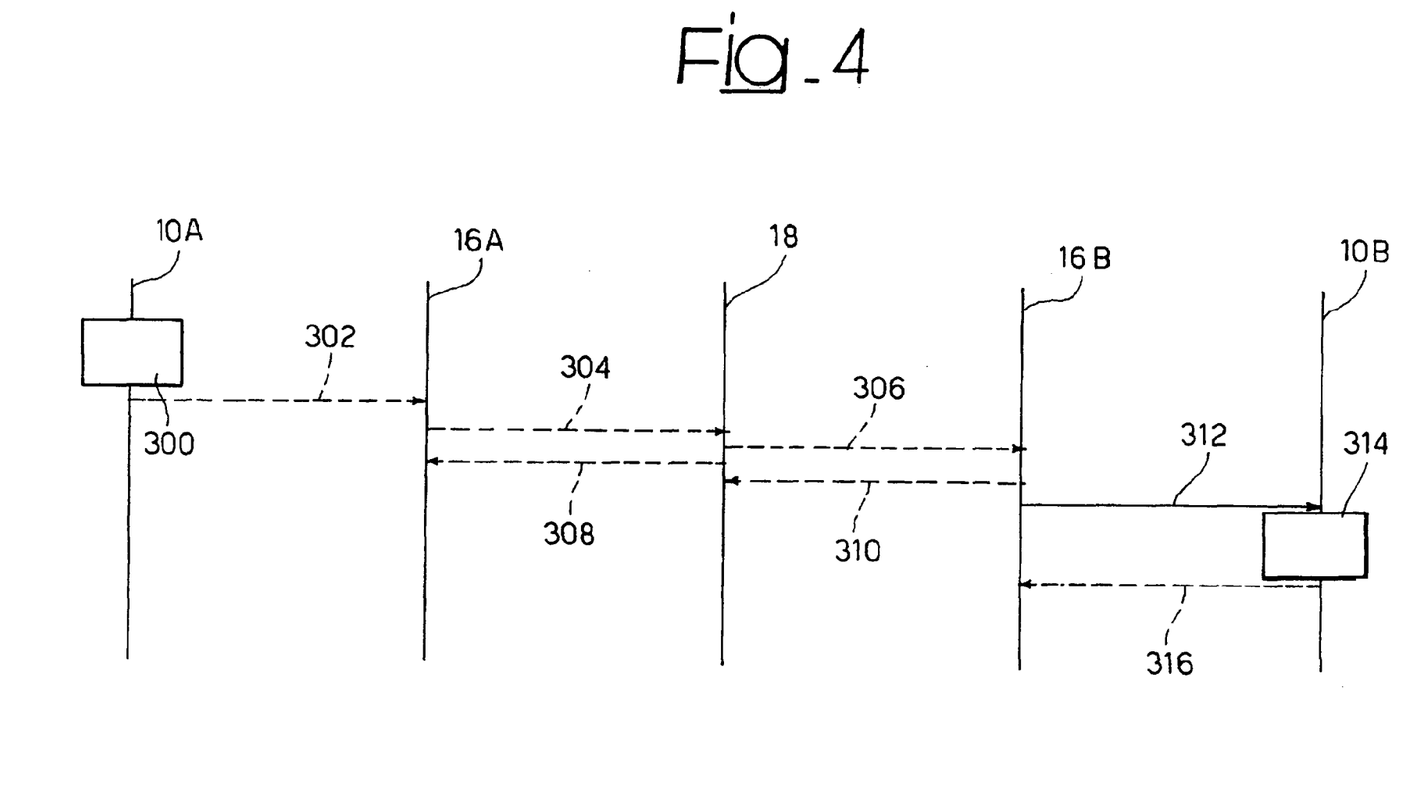

The various columns of FIGS. 2 to 4 are labeled with references 10A and 10B corresponding to the two terminals (and, indirectly, the two customers equipped with those terminals), while the references 16A and 16B correspond to the two nodes enabling the terminals 10A and 10B to connect to the network N. Finally, the reference 18 corresponds to the service center.

Once again it will be recalled that the following detailed description refers to a videophone call involving two parties. This is essentially for the sake of simplicity, and those of skill in the art will be able to derive from this description the criteria for applying the arrangement described herein to multi-party calls i.e. calls involving three or more parties. In that case, specific technical arrangements are required in order to properly distribute the video signal generated by any party in the call to the other parties. Technical arrangements supporting this mode of operation are known in the art and do not require to be described in detail here.

Essentially, the chart of FIG. 2 is representative of the steps taken in order to set up a standard telephone (i.e. speech) call between the terminals 10A and 10B. Within the framework of that call, the two parties 10A and 10B may jointly decide to convert the telephone call into a videophone call.

The chart of FIG. 3 is representative of the basic steps involved in accepting, setting-up, and running a videophone call between the two parties 10A and 10B.

Finally, the chart of FIG. 4 is representative of the steps involved in finally terminating and releasing the videophone call.

In all of the flow charts of FIGS. 2 to 4 the signalling flow is indicated by dashed lines, while continuous lines are used to indicate voice or voice/video trunk flow signals.

In the chart of FIG. 2 reference 100 designates a step by means of which the customer using the terminal 10A (hereinafter "customer A") dials the phone number of another customer provided with terminal 10B (hereinafter "customer B").

To that end, the customer A dials the phone number of customer B or chooses the B number from the phone book. Under these "off hook" conditions, the dialed numbers are sent in a step 102 to the node 16A. Typically, multi frequency dialing (DTMF—Dual Tone Multi Frequency) is used for that purpose.

In a step 104, thorough the public switched telephone network (N) the node (exchange) 16A sends a combined IAM (Initial Address Message), SAMs (Subsequent Address Messages)—if any—to the node (exchange) 16B which, in a step 106, activates ringing with the telephone terminal 10B.

In a step 108 the node 16B sends an ACM (Address Completed Message) to the node 16A.

A step 110 is representative of the customer 10B answering the call, which leads to an "off hook" condition being received by the node 16B in a step 112 while in a step 114 the node 16B sends an ANM (ANswer Message) to the node 16A.

A regular telephone call having being established between the customer 10A and the customer 10B is represented by a step 116.

The following steps are representative of the customer 10A and 10B negotiating over the voice trunk previously established a joint agreement to switch from a telephone call to a video telephone call.

In the exemplary embodiment shown herein, the process will be assumed to be started by the customer 10A.

Those of skill in the art will however promptly appreciate that the process can be started in a thoroughly similar way by the customer 10B.

Additionally, it will appreciated that the negotiation to switch from a telephone call to a video telephone call may be started at any time after the telephone call has been setup. Stated otherwise, in the arrangement described herein, no direct dependency/relationship exists between the time where the telephone call is setup and the time when the telephone call is switched into a video telephone call.

It will be further appreciated that setting up a regular telephone call between the customers 10A and 10B enables these to ascertain that both customers are equipped with video telephone terminals.

In order to establish the video telephone call, one of the customers (customer 10A, in the exemplary embodiment shown herein) takes an action such as pushing a "video" button 11A (see FIG. 1) provided in the respective video telephone apparatus.

This occurs in a step designated 118 in FIG. 2 and leads, in a step 120 to a corresponding signal (typically a DTMF tone sent over the voice trunk established between customers 10A and 10B) being sent from the 10A to the terminal 10B.

The result, as represented by a step 122, is typically a message being displayed (or otherwise made available e.g. by some sort of ringing) to the customer 10B.

Simultaneously, a timer is started in a step 124 with the terminal 10A, while a corresponding message is displayed on the terminal to indicate that the signal requesting possible switching to a video telephone call has been forwarded to the terminal 10B in order to give to the corresponding customer the time to express his or her desire to switch to a video telephone call.

At this point, the customer 10B may in fact refuse the proposal of switching to a video telephone call, which may simply be expressed by the customer 10B taking no action in the course of the duration of the timer started in the step 124. In that case (not positively shown in FIG. 2), the call is continued as a regular phone call.

The customer 10B typically expresses his or her consensus by pushing a corresponding "video" button 11B in his or her terminal. This leads to a corresponding signal (again typically DTMF tone) being sent in a step 128 towards the customer 10A.

It will thus be appreciated that in the preferred, exemplary embodiment shown herein switching from a telephone call to a video telephone call takes place only as a result of both customers involved (and, in general, at least two out of three or more customers possibly involved) positively expressing their desire to change the type of the call.

Those of skill in the art will further appreciate that the one shown is just an example of the many different modes that may lead the two customers 10A and 10B to reach an agreement on switching from a telephone call to a video telephone call.

Alternative embodiments may include e.g. arrangements wherein the terminal of either customer immediately issues a "proposal" signal for switching to a video call whenever a voice trunk is established with another customer, possibly after having checked that this latter is equipped with a terminal adapted to support video telephone service. Similarly, the terminal 10A, 10B of either party may be configured (e.g. programmed) in such a way to reciprocate automatically in the positive (or in the negative) any "proposal" possibly received to establish a video telephone call.

The steps designated 130 to 148 are representative of a sequence of steps that lead to the voice trunk established between the customer 10A and 10B to be discontinued (that is the telephone call released) once the customers involved in the call have decided to switch to a video telephone call.

Specifically, after receiving the "consensus" message from the terminal customer 10B in the step 128, the terminal 10A closes in a step 130 the audio flow (so that the customers do not hear tones generated by the network) while possibly displaying a message to the effect that the video telephone call is being setup.

Simultaneously, a timer is activated in a step 132 with the terminal 10B, while in a step 134 a message is displayed to the corresponding customer indicating that the video telephone call is being setup.

The steps designated 136, 138, 140 are representative of an "on hook" condition received by the node 16A, a Release Message (REL) sent from the node 16A to the node 16B and a congestion tone sent from the node 16B to the terminal 10B. The customer using the terminal 10B will not hear this tone since, after sending the DTMF tone, the terminal 10B closes the audio flow.

In a step 142, a RLC (Release Complete Message) is sent back from the node 16B to the node 16A while a timer is set in a step 144 with the terminal of the customer 10A.

In a step 146 an "on hook" condition (generated automatically) is received from the node 16B and in a step 148 the telephone call between the terminal/customer 10A and the terminal/customer 10B is released.

This occurs while both terminals 10A and 10B are in fact with their handsets in the "off-hook" condition.

The steps designated 200 to 244 in FIG. 3 correspond to the video telephone call being established between the terminal 10A and the terminal 10B.

Specifically, in a step 200 the customer 10A (it is again recalled that the process may be alternatively started, in a thoroughly symmetrical way, by the customer 10B) starts a sequence of steps aiming at establishing a voice trunk between the terminal 10A and the service center 18.

These steps include the issue of an "off hook" multi-frequency (DTMF) dialing signal (step 202) from the terminal 10A towards the node 16A. Again it will be appreciated that such signal is generated automatically since the terminal 10A (and the terminal 10B as well) is kept with the handset in the "off-hook" condition.

Subsequently, in a step 204, the node 16A sends towards the service center 18 the IAM, SAM messages.

In addition to the Service Access Code (SAC1) information required for the terminal 10A to reach the service center 18, the messages in question also include items of information, designated DN1 and DN2, representative of the destination numbers, namely the phone numbers of the customers 10A and 10B.

In a step 206, a timer is started with the service center 18 while an ACM message is sent back in a step 208 towards the node 16A.

A timer has also been started in a step 210 with the customer 10A after issuing the message of the step 202: this timer is intended to be stopped once the voice trunk is established between the terminal of customer 10A and the service center 18, which occurs in a step 212.

In an essentially symmetrical way, the terminal 10B has previously started a timer in a step 213 in order to issue in a step 214, after a predetermined period of time, a message intended to establish a call with the service center 18. To that effect, in a step 216 an "off hook" DTMF dialing tone is sent towards the node 16B, which in turn issues, in a step 210, IAM, SAM messages towards the service center 18.

The messages in question generally include the SAC2 indicator required for the terminal 10B to reach the service center 18. The information concerning the phone number of the customer/terminal 10B is also sent in order to match with the corresponding information previously sent from the terminal 10A in the step 204.

The reference numeral 220 indicates the steps in which the service center 18 sends back to the node 16B the ACM message.

The steps 218 and 220 occur while a timer is running (step 222) with the customer 10B.

The reference numeral 224 indicates the voice trunk being established between the terminal 10B and the service center 18.

When the voice trunks ("legs") between the service center 18 and the two terminals 10A and 10B are established, corresponding DTMF tones are sent in steps 226 and 228 from the service center 18 towards the two terminals 10A and 10B over the voice trunks established between the service center and the terminals 10A and 10B, respectively. The service center also sends (step 230) the corresponding ANM messages to the nodes 16A and 16B.

All the foregoing leads to a voice trunk being established between the customer 10A and the customer 10B—via the service center 18.

Specifically, reference numeral 232 designates the act of connecting the "legs" established with the node 16A and 16B by the service center 18 while reference numeral 234 denotes the establishment of the voice trunk between the terminal 10A and 10B.

The blocks designated 235 and 236 indicate steps where the two terminals 10A and 10B activate the respective modems enabling the exchange of audio/video signals.

Reference 238 designates a step wherein a handshake takes place between the terminals 10A and 10B, while the steps 240 and 242 designate the establishment of the bi-directional audio/video flows between the terminals 10A and 10B.

The video telephone call is thus established (step 244)—via the service center 18.

It will be appreciated that the whole process described in the foregoing is run under the control of the service center 18. When setting up the "leg" connections towards the two customers/terminals 10A, 10B involved in the video telephone call, the nodes 16A and 16B are thus in a position to select telephone lines having a quality level (e.g. a signal-to-noise ratio) adapted to ensure that the video portion of the video telephone signal is thoroughly intelligible at the reception points. Those lines can be selected as lines different from the line(s) used for the basic telephone call previously described in connection with FIG. 2.

The service center 18 detaining the information concerning the two terminals 10A and 10B enables the terminal 10 to run the billing process for the video telephone call in a completely flexible way.

Specifically, the cost of the video telephone call can be charged to either or both parties in equal or different percentages.

These percentages can be fixed beforehand, e.g. by establishing that the cost of the video telephone call will be charged to the customer who made the "proposal" to start the video telephone call (this being possibly different from the party who placed the original telephone call). Alternatively, the percentages in question may be established (in a sequence of steps not shown in FIG. 2) during either of the "initial" telephone call or the video telephone call.

It will appreciated that these billing arrangements may be different from those applied during the initial telephone call and may include the possibility of running a "Green Number" service, thus causing the cost of the video telephone call to be charged—at least at certain times of day—to the party running the service.

Further alternative arrangements will be evident for the person of skill in the art.

The block designated 246 indicates the possibility for the service center 18 to perform (in a manner known per se) a transcoding action permitting proper bi-directional transmission/reception of a audio (and, more to the point, video) signals between the terminals 10A and 10B even when the standards used by the two terminals in question are different, e.g. because the two terminals adopt different formats for the compression of the video signal and/or have different bandwidths/bit-rates available for establishing the telephone channel, this being possibly the case e.g. of a mobile phone.

The chart of FIG. 4 is representative of the process of the video telephone call being released as a result of a respective action being taken by the customer 10A. Those of the skill in the art will promptly appreciate that a thoroughly similar process will take place (with a mirror-like arrangement with respect to the one shown in FIG. 4) when the release of the video telephone call is prompted by an action of the customer 10B.

Specifically, reference 300 indicates the action taken by the customer 10A to release the video telephone call. This may typically be the result of the customer 10A placing his or her handset back on the telephone apparatus, which leads to an "on hook" condition being sensed by the node 16A in a step 302.

The references 304, 306, 308 and 310 are representative of the REL message being forwarded from the nodes 16A on to the service center 18 and the node 16B, and the RLC messages being sent in return from the node 16B to the service center 18 and from the service center 18 to the node 16A.

The step 312 designates the step where the node 16B sends the congestion tone towards the customer 10B who, in a step 314, releases in turn the call. This leads to a corresponding "on hook" condition being sensed by the node 16B in a step 316.

At this point the video telephone call is terminated.

Of course, without prejudice to the underlying principles of the invention, the details and the embodiments may vary, also significantly, with respect to what has been described and shown merely by way of example, without departing from the scope of the invention as defined by the annexed claims.

The invention claimed is:

1. A method of setting up a video telephone call between at least one first video telephone terminal and at least one second video telephone terminal in a telephone network, comprising the steps of:
   establishing a telephone call over said network between said first terminal and said second terminal;
   exchanging between said first and second terminals during said telephone call availability signals to seek availability of said first and second terminals to hold a video telephone call therebetween; and
   if said availability is confirmed:
      i) releasing said telephone call between said first and second terminals,
      ii) after releasing said telephone call between said first and second terminals, establishing telephone calls between a service center provided in said network and said first and second terminals, whereby said first and second terminals are connected to one another over said telephone network via said service center, and
      iii) establishing a video telephone call between said first and second terminals connected via said service center.

2. The method of claim 1, comprising the steps of:
   running said video telephone call between said first and second terminals over said telephone network by exchanging between said first and second terminals compressed speech/video signals.

3. The method of claim 2, comprising the steps of:
   exchanging between said service center and said first terminal signals compressed according to at least one first compression standard;
   exchanging between said service center and said second terminal signals compressed according to at least one second compression standard; and
   transcoding at said service center said compressed signals between said at least one first standard and said at least one second standard.

4. The method of claim 1, comprising the step of performing billing of said video telephone call at said service center.

5. The method of claim 4, comprising the step of performing said billing according to a billing process selected from the group of:
   billing the cost of said video telephone call to either of said first and second terminal, and
   billing the cost of said video telephone call to both of said first and second terminals at respective percentages.

6. The method of claim 1, comprising the steps of causing one of said first and second terminals to issue during said telephone call an inquiry signal directed to the other of said first and second terminals to seek availability of said other of said first and second terminals to hold a video telephone call.

7. The method of claim 1, comprising the step of causing one of said first and second terminals to issue an availability confirmation signal to confirm to the other of said first and second terminals, the availability to hold said video telephone call.

8. The method of claim 1, wherein said availability signals are in the form of off hook multi-frequency dialing signal.

9. A computer program product loadable in the memory of at least one computer and comprising software code portions capable of performing the method of claim 1.

10. A system for setting up a video telephone call between at least one first video telephone terminal and at least one second video telephone terminal in a telephone network, comprising:
   a service center adapted to connect with said first and second terminals over said telephone network,
   said first and second terminals configured for establishing over said network a telephone call therebetween, said first and second terminals further configured for exchanging during said telephone call availability signals to seek availability of said first and second terminals to hold a video telephone call therebetween, and if said availability is confirmed,
      i) releasing said telephone call between said first and second terminals, ii) after releasing said telephone call between said first and second terminals, establishing telephone calls between said service center and said first and second terminals, whereby said first and second terminals are connected to one another over said telephone network via said service center, and iii) establishing a video telephone call between said first and second terminals connected via said service center.

11. The system of claim 10, wherein said first and second terminals are configured for running said video telephone call over said telephone network by exchanging compressed speech/video signals.

12. The system of claim 11, wherein:
said first terminal is configured for exchanging with said service center, signals compressed according to at least one first compression standard,
said second terminal is configured for exchanging with said service center signals compressed according to at least one second compression standard, and
said service center comprises at least one transcoding module for transcoding said compressed signals between said at least one first standard and said at least one second standard.

13. The system of claim 10, wherein said service center comprises at least one billing module for performing billing of said video telephone call.

14. The system of claim 13, wherein said billing involves at least one of:
billing the cost of said video telephone call to either of said first and second terminal, and
billing the cost of said video telephone call to both of said first and second terminals at respective percentages.

15. The system of claim 10, wherein at least one of said first and second terminals is configured for issuing during said telephone call inquiry signals directed to the other of said first and second terminals to seek availability of said other of said first and second terminal to hold a video telephone call.

16. The system of claim 10, wherein at least one of said first and second terminals is configured for issuing an availability confirmation signal to confirm to the other of said first and second terminals, the availability to hold said video telephone call.

17. The system of claim 10, wherein said first and second terminals are configured for issuing said availability signals in the form of off hook multi-frequency dialing signal tones.

18. A video telephone terminal configured for use as one of said first and second terminals in the system of claim 10.

19. A service center configured for use in the system of claim 10.

* * * * *